United States Patent
Fleck (12) 
(10) Patent No.: US 12,079,362 B2
(45) Date of Patent: Sep. 3, 2024

(54) DATA SUNDERING

(71) Applicant: Matthew Raymond Fleck, Pleasant Hill, CA (US)

(72) Inventor: Matthew Raymond Fleck, Pleasant Hill, CA (US)

(73) Assignee: Anonomatic, Inc., Menlo Park, CA (US)

( * ) Notice: Subject to any disclaimer, the term of this patent is extended or adjusted under 35 U.S.C. 154(b) by 457 days.

(21) Appl. No.: 17/229,493

(22) Filed: Apr. 13, 2021

(65) Prior Publication Data

US 2021/0326470 A1 Oct. 21, 2021

Related U.S. Application Data

(60) Provisional application No. 63/011,711, filed on Apr. 17, 2020, provisional application No. 63/051,260, filed on Jul. 13, 2020.

(51) Int. Cl.
*G06F 21/62* (2013.01)
*G06F 16/22* (2019.01)
*G06F 16/242* (2019.01)

(52) U.S. Cl.
CPC ...... *G06F 21/6227* (2013.01); *G06F 16/2282* (2019.01); *G06F 16/2443* (2019.01); *G06F 21/6254* (2013.01)

(58) Field of Classification Search
CPC ............. G06F 21/6227; G06F 16/2282; G06F 16/2443; G06F 21/6254
USPC ........................................................ 726/26
See application file for complete search history.

(56) References Cited

U.S. PATENT DOCUMENTS

| | | | | |
|---|---|---|---|---|
| 10,671,712 B1* | 6/2020 | Lindley | ............... | H04L 63/0861 |
| 11,567,969 B2* | 1/2023 | Graefe | ................. | G06F 9/5061 |
| 11,777,729 B2* | 10/2023 | Williams | .............. | G06F 16/909 |
| 2014/0122508 A1* | 5/2014 | Eigner | ................. | G06F 3/0487 |
| | | | | 707/752 |
| 2016/0241389 A1* | 8/2016 | Le Saint | ............... | H04L 9/0844 |
| 2017/0223003 A1* | 8/2017 | Miles | ................. | G06F 21/6254 |

(Continued)

OTHER PUBLICATIONS

Zigomitros et al., 2020 IEEE Access, "A Survey on Privacy Properties for Data Publishing of Relational Data", pp. 51071-51099 (Year: 2020).*

(Continued)

*Primary Examiner* — Khalil Naghdali
(74) *Attorney, Agent, or Firm* — Pete Tormey; AT&P pc (57) ABSTRACT

An improvement to a database management system including receiving a data and creating a record key for the data and modifying the record key by hashing it with a predefined modifier and storing the data with the modified record key. Storing the data with an altered record ID obfuscates the data without an encryption step. In some embodiments hashing includes adding or subtracting a predetermined number from the record key. The record key may be created by combining a user key and a private key. To retrieve data, the method provides for receiving a record request including the public key and hashing the public key with the private key to determine a record identifier and querying the database to return the proper data. These methods may be incorporated into database operations providing a secure database without the resource overhead of encryption.

2 Claims, 6 Drawing Sheets

(56) References Cited

U.S. PATENT DOCUMENTS

2018/0115416 A1* 4/2018 Diehl ........................ H04L 9/30
2018/0150544 A1* 5/2018 Bensberg .............. G06F 16/278
2018/0285591 A1* 10/2018 Thayer ................ G06F 21/6254
2020/0074059 A1* 3/2020 Beckett, Jr. ............. G06F 21/36
2020/0336318 A1* 10/2020 Garg .................... H04L 9/3247

OTHER PUBLICATIONS

Kokkonis et al., 2019 IEE, "Measurements on encrypted and non-encrypted IoT datasets stored in relational and JSONB fields", pp. 1-6 (Year: 2019).*

* cited by examiner

FIG. 6

DATA SUNDERING

PRIORITY

This application claims the benefit of provisional applications 63/011,711 filed Apr. 17, 2020 and 63/051,260 filed Jul. 13, 2020. Both of which are included by reference as if fully set forth herein.

BACKGROUND

A major problem with structured data storage is the ability to maintain confidentiality even if access to the data store is somehow compromised. This is most readily apparent for the storage of medical information, where the Health Insurance Portability and Accountability Act (HIPAA) provides for a very high degree of privacy even within a single institution.

Unfortunately, this high degree of privacy prohibits the easy collation, sharing and transfer of information between people and organizations that could benefit from easy access to the information. For example, and without limitation, a physician treating a person suffering a traumatic injury would not have any way to easily access medical, dental and psychological data from various databases. Even if that data was technically accessible, the HIPAA requirement would bar any personal identifiable information (PII) from being disclosed.

Similarly, large record sets of medical research data needs to be scrubbed of PII before it can be shared thus severely limiting the ability to cross index datasets to look for correlations and cross correlations in the data and with a person's medical history and treatment. There are many techniques used to protect data within databases. Most of them exist outside of the database and are enacted to prevent unauthorized access to, and exposure of, the data. Additionally, when data within a database is deemed to be especially sensitive it is often encrypted using state of the art encryption algorithms.

However, while encrypting specific data within a database does provide protection it is not an effective solution when standard database functionality, such as searches, need to be performed on that data. While hash values do provide some amount of searching capability that method is also inherently limited. This is because the database is forced to decrypt the value of every field being searched in the database before it can be evaluated making searches of encrypted data resource intensive.

Presented herein are systems and methods for addressing these well-known deficiencies in data management of personal identifiable information.

SUMMARY

Disclosed herein are systems and methods for an improvement to a database management system including receiving a data and creating a record key for the data and modifying the record key by hashing it with a predefined modifier and storing the data with the modified record key. This may provide for sundered data, split into different records. Moreover, by storing the data with an altered record ID the data is obfuscated without an encryption step, thus saving computing resources and increasing performance.

In some embodiments hashing includes adding or subtracting a predetermined number or character from the record key. In some embodiments, the record key may be created by combining a user key and a private key to keep each party unaware of how the other party obfuscates the data. To retrieve data, the method provides for receiving a record request including the public key and hashing the public key with the private key to determine a record identifier and querying the database to return the proper data.

Additionally, these methods may be incorporated into database operations providing a secure database without the resource overhead of encryption. The database instructions may be modified to provide for creating, using, altering and sundering data.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "operable" generally refers to set of conditions or instructions that will enable an element to perform a function or task. The conditions or instructions may be performed using hardware or software in varying embodiments.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The term "Sunder" generally means to separate into parts or to split apart in a manner that the parts may be reconstructed by reversing the process.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

The term "virtual machine" or "VM" generally refers to a self-contained operating environment that behaves as if it is a separate computer even though it is part of a separate computer or may be virtualized using resources form multiple computers.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.
System Elements
Processing System The methods and techniques described herein may be performed on a processor-based device. The processor-based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover, any device or system that operates to effectuate techniques according to the current disclosure may be considered a server for the purposes of this disclosure if the device or system operates to communicate all or a portion of the operations to another device.

Figure 1:
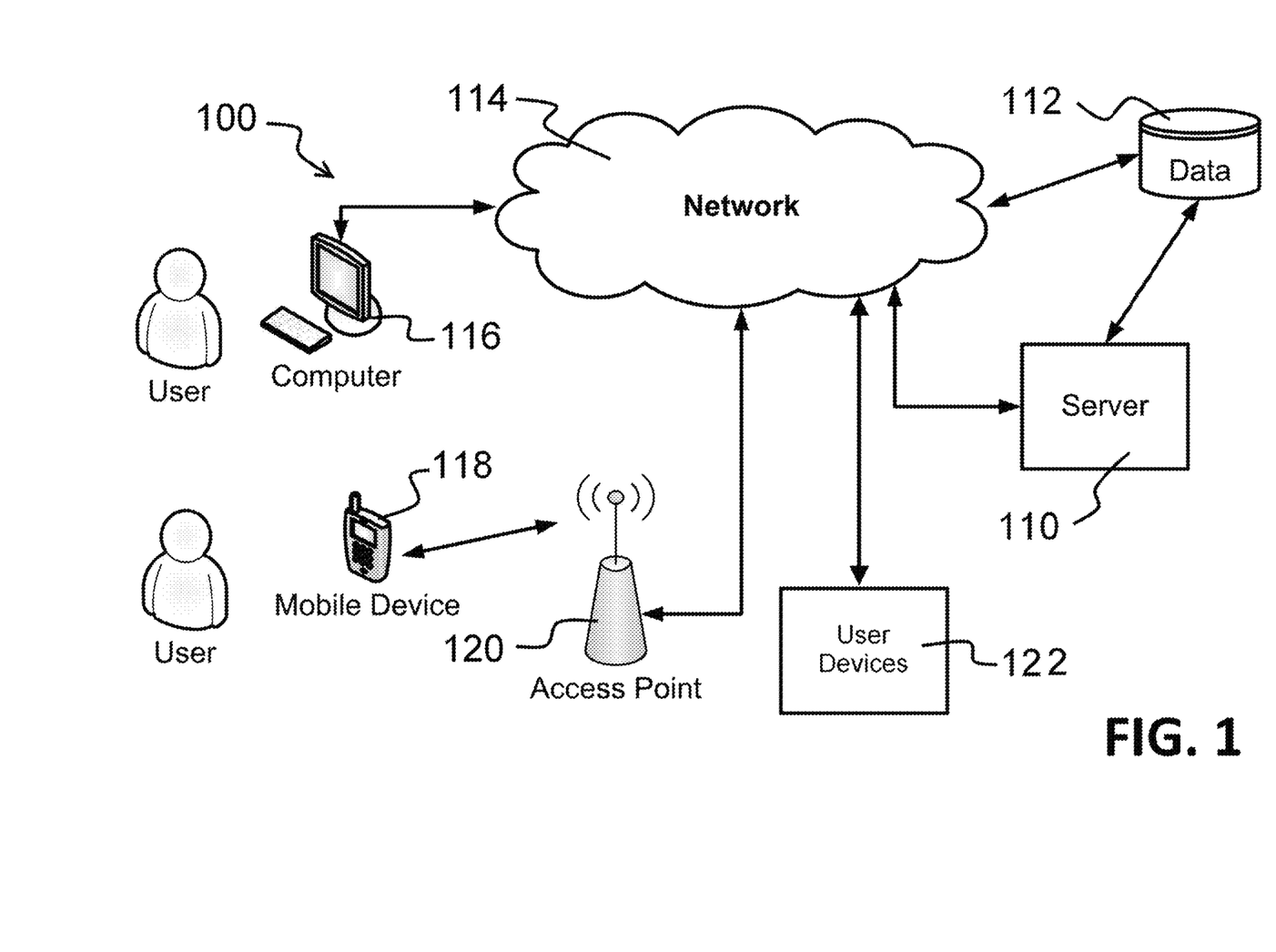
FIG. 1 shows a functional block diagram of a client server system.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively, the entire processing system may be self-contained on a single device.
Client Server Processing FIG. 1 shows a functional block diagram of a client server system 100 that may be employed for some embodiments according to the current disclosure. In the FIG. 1 a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively, the user may access the server 110 through the network 114 by using a smart device such as a telephone or PDA 118. The smart device 118 may connect to the server 110 through an access point 120 coupled to the network 114. The mobile device 118 includes a sound capture device such as a microphone. Other connected user devices 122 may also be employed in certain embodiments.

Conventionally, client server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine-readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine, a data engine, an execution engine, a user interface (UI) engine and the like may be employed. These engines may seek and gather information about events from remote data sources. Besides engines for querying and reporting on data, certain embodiments may also include an anonymizer engine.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Private, Identifiable Information

Private, identifiable information (PII) may include, but is not limited to: names, birth dates, IDs such as the U.S. social security numbers, account numbers (credit card, bank accounts, etc.), addresses, phone numbers and other data whose exposure or misuse creates risk. This type of data is routinely stored in databases. If these databases are compromised, even with internal anonymization techniques, PII may be subject to exposure by experienced data pirates. One benefit of the present disclosure is the ability to reduce or eliminate the risk of exposure of this data in the case of a data breach.

Data Record Sundering

Figure 2:
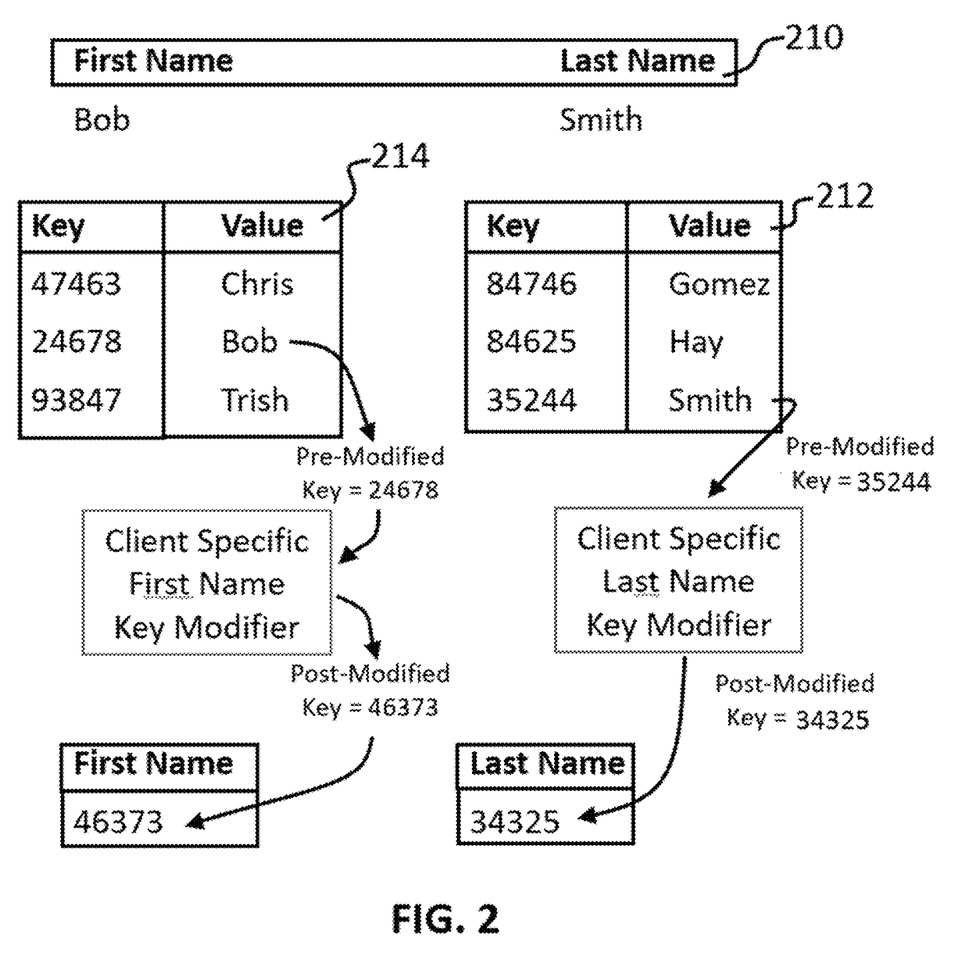
FIG. 2 illustrates a process for data record sundering.

FIG. 2 illustrates a process for data record sundering. A record 210 including a field for a first name and a last name has data "Bob" for the first name and "Smith" for the last name. This record may be represented in two different tables, a last name table 212 and a first name table 214. A first name table 214 may include a unique key for every unique first name value in the table. Similarly, a last name table 212 may have a unique key for every unique last name value. Each Key field in these tables may be automatically assigned a unique number within that table.

While FIG. 2 only shows information for two fields in a record, this application should not be ready as limiting in any way. For example, and without limitation, fields such as Date of birth, Gender, Social Security Number, and other PPI may be included. Accordingly, a record for a new Person record could be created that has four numeric key values. Each of the numeric values would point to the appropriate value within the table that stores values for that column. For example:

First_Name_ID=1001
Last_Name_ID=8493
Date_Of_Birth_ID=2612
Gender_ID=2

However, merely splitting the table and assigning a unique key is insufficient to hinder unauthorized use of the data. Anyone who was able to access the database would have the ability see all of the data values of each record. To fully sunder the record a modifier may be used. A modifier is a number which is used to alter the value of the ID column in the person record so it does not point to the correct record in the table but instead points to an incorrect record in the table. For example, if the Modifier for First Name was +27 then the value of First Name Key stored on the person record, for anyone with the same first name would be the original Key plus 27. Therefore, a person reading this as a simple substitution would be thwarted by the offset. Embodiments that employ this approach, and by using different modifiers for each column, will hamper the ability of anyone who was able to gain access to the database, but was not provided with the appropriate Modifiers, would not be able to actually read and understand any of the Person records because as far as they were able to ascertain, the values would evaluate to incorrect data. Modifiers may be positive, negative or other mathematical functions that may be operated on a Key to provide a reliable post-modified Key.

In FIG. 2 a pre-modified Key 24678 for the first name "Brenna" may be modified to have a post-Modified Key of 46373. Note also, that both the first name field and the last name filed may have different Modifiers. Moreover, every field may have its own Modifier.

In some embodiments further obfuscation may be accomplished with additional steps. In embodiments with different logical "owners" for different rows, each logical owner of different data rows in a dataset could be allocated different Modifiers. Thus, if someone was able to recombine data for one data owner, they would not be able to do the same for any other data owner unless they also had those Modifiers.

In some embodiments, Modifiers may be in two parts with one part (External) being provided to each customer (Data Owner) and the second part (Internal) being assigned and kept internally for each customer. It is not the value of either the Internal or the External modifier which is used provide the appropriate link but rather both of them combined. For example, and without limitation, if customer A is given an External First Name Modifier of 231, which they may know, and an internal modifier of −523 which they would not know. The actual First Name Modifier would be 231−523=−292. If customer A is given an External First Name Modifier of 843, which they may know, and assigned an internal modifier of −1089. Their actual First Name Modifier would be 843−1089=−246. Accordingly, the External Modifiers may be generated and provided to the customer but never stored by a data store or storage controller. The Internal modifiers may be generated for each customer but never provided to that customer.

The external modifiers and resulting sundered data may be exposed to remote users through an application programming interface (API). This may further allow users to get data while keeping an Internal modifier from being exposed to the public.

One major benefit of internal and external keys is that even the data storage provider, which stores and manages all of the data, could not properly recombine all of the data without being provided the external ID from the customer. Moreover, if a hacker were to create a customer account, and get their external ID, it would not aid them in stealing anyone else's data.

Sundering Data Locations

One requirement for a data storage custodian may be to locate PII in specific countries or geographic areas to comply with laws or for better quality of service. To effectuate this, each record may have the location of the data provider or data source sundered and recorded as data in the data store. This may allow for sharing data internationally, but still maintaining PII private because the data that must be held in confidence remains subject to these requirements, but other, non-confidential, data may be readily available around the world. This may be effectuated with a location table including unique IDs for each location. With the location data sundered, it may then be further obfuscated using an offset as described herein.

Figure 3:
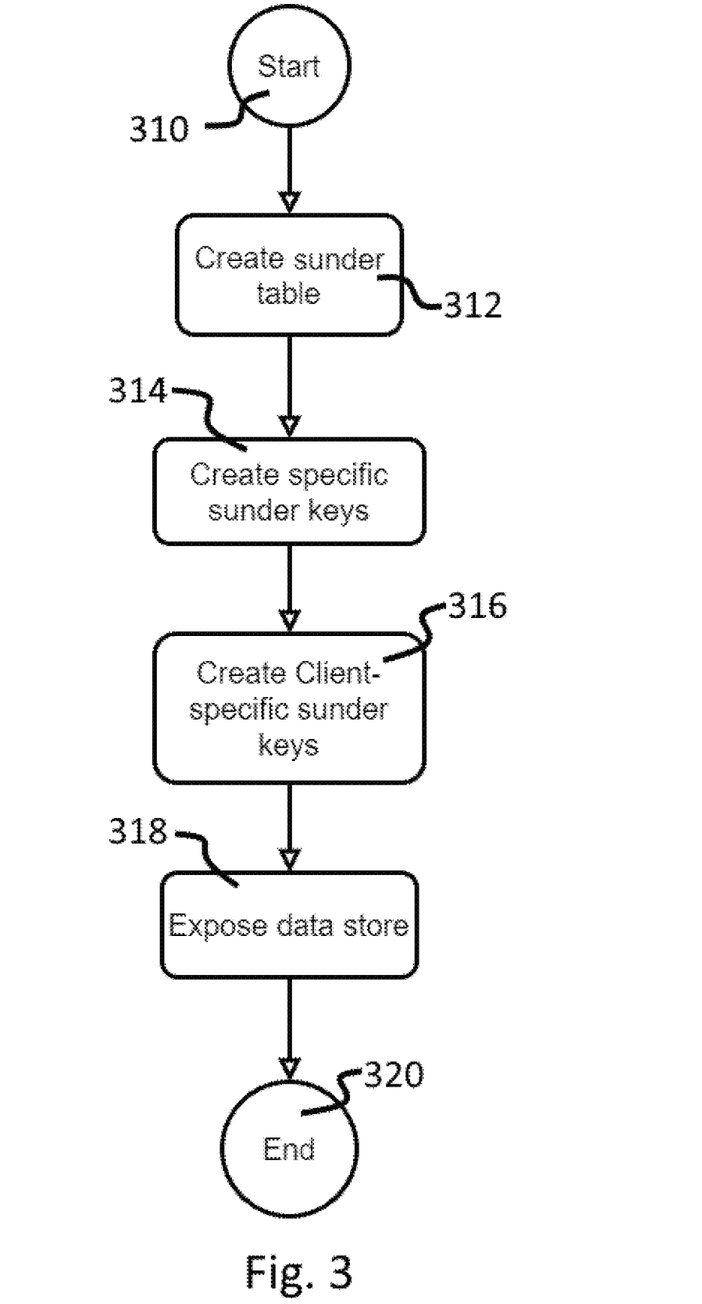
FIG. 3 shows a flowchart of steps which may be employed in certain embodiments.

FIG. 3 shows a flowchart of steps which may be employed in certain embodiments. In FIG. 3 the method starts at a flow label 310. At a step 312 a sunder table is created. This table may be for first names, last names, locations or any other data descriptor suitable for the application.

At a step 314 specific sunder keys are created. These are unique to every data owner and data column being sundered.

At a step 316 client-specific sunder keys are created. These are unique to each client/user intending to store data in the manners described herein. The client specific sunder keys are combined with the sunder keys for each data when storing or retrieving data in the data store.

At a step 318 the data store is exposed to users. This exposure may be in one of the many convention data access methodologies such as SQL Server, XML, and the like.

At a flow label 320 the method ends.

The methods described herein may not require each and every step be performed or that each step be performed in the manner disclosed. Embodiments may be effectuated using various elements and steps described.

Anonymization Engine

Different embodiments of the present disclosure may be effectuated to meet varying demands of data security. Certain embodiments may include a series of processes generally referred to as an anonymization engine. The anonymization engine provides for data transfer between a data source and a data recipient while obfuscating or securing PII. This anonymization engine may include one or more of the following capabilities:

Providing a new and unique identifying value (Anonymous ID) for an entity when requested by a data source providing PII.

Enabling a data recipient to receive the same, but unique, Anonymous ID, for the same individual, when data for that individual is provided by different data sources.

Enabling a dada recipient to receive different and unique Anonymous IDs, for the same individual, when PII for that individual is provided by different data sources.

Enabling the data recipient to receive a matching table which will enable them to link the different Anonymous IDs provided by different data sources.

Enabling a specific individual, whose data is being shared, to grant or deny permission for the data recipient to combine their data from specific data sources.

Operating in a synchronous mode where the data source requests an Anonymous ID and then uses it for processing not connected to the data source.

Operating in a unidirectional, asynchronous mode where the data source provides a complete set of data, including PII, where the Anonymization Engine replaces PII with the Anonymous ID.

Operating in a bi-directional, asynchronous mode where the Anonymization Engine receives a complete set of data, including PII, from a data source then sends it to a data recipient, either with or without replacing the PII with the Anonymous ID, and then sends a response from the data recipient to the data source ensuring the PII has been replaced with the Anonymous ID.

Operating in a bi-directional, asynchronous mode where the Anonymization Engine receives a set of data which includes an Anonymous ID, but no PII. The Anonymization Engine may then replace the Anonymous ID with the PII, send the complete set of data to the data recipient, and then return the data recipient's response to the data source.

Figure 4:
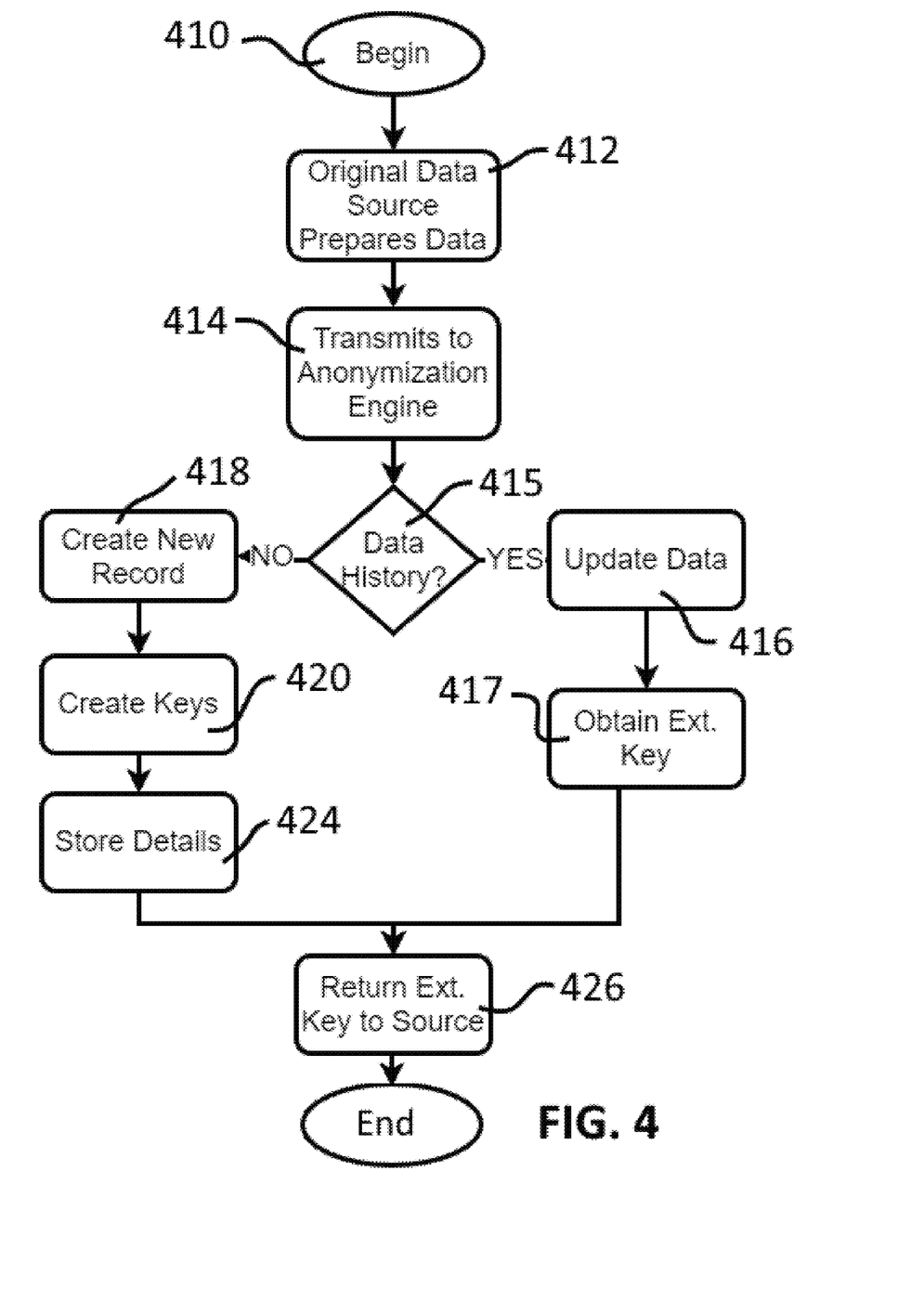
FIG. 4 is a flow chart of certain processes that may be used to effectuate an anonymization engine.

FIG. 4 is a flow chart of certain processes that may be used to effectuate an anonymization engine. The method begins at a flow label 410. At a flow step 412 an original data source prepares data or entry into the method. This data may include PII and a source ID unique to the original data source.

At a step 414 the data from the original data source is transmitted to an anonymization engine.

At a step 415 the anonymization engine analyzes the data to see if there is a history for this PII and this data source. If yes, flow proceeds to a step 416, else flow proceeds to a step 418.

At the step 416 the anonymization engine updates a repository with any changes to PII and obtains an external anonymous key at a step 417.

While at the step 418 the anonymizer engine creates a new record for the new individual and flow proceeds to a step 420.

At the step 420 the anonymizer engine creates both internal and external anonymous keys.

The details are stored at a step 522 and flow proceeds to a step 424.

At a step 426 the external key is returned to the original data source and the method ends.

The techniques disclosed herein provide a major advantage in that they allow for matching data between different data sources without having to disclose any PII. This advantage secures privacy while allowing critical data operations. For example, and without limitation, a school district can combine medical, academic and financial records on its students to find better ways to provide services without disclosing names and medical histories of students.

Figure 5:
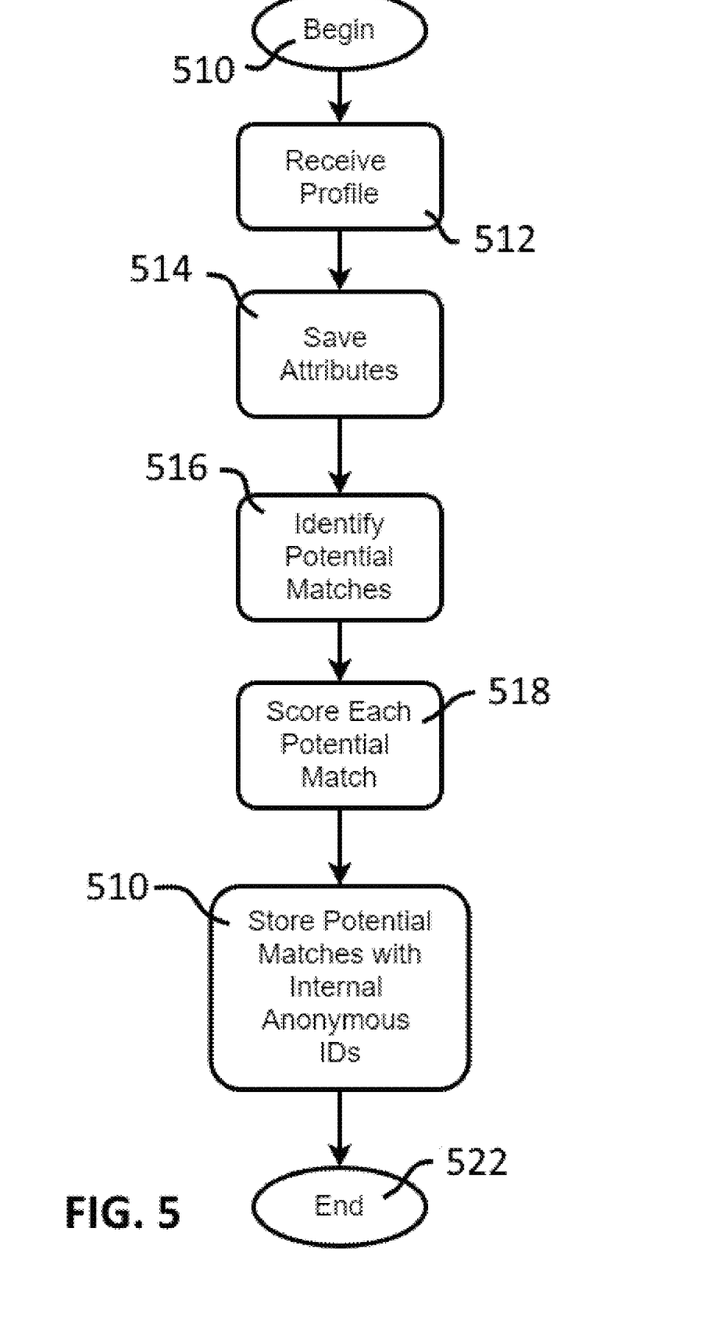
FIG. 5 illustrates a method which includes steps for matching a profile across different data stores.

FIG. 5 illustrates a method which includes steps for matching a profile across different data stores. The method begins at a flow label 510.

At a step 512 an anonymization service receives a new or updated profile.

At a step 514 the profile is stored.

At a step 516 potential matches are identified by comparing data from different sources.

At a step 518 each potential match is scored with a probability value. The probability value calculation may include one or more scoring algorithms.

At a step 520 the potential matches are stored using internal anonymous identifiers.

At a flow label 522 the method ends.

Internal and External Identifiers

Each data source using the techniques described herein may have a unique identifier or globally unique identifier (GUID). That identifier may be hashed with a unique identifier that the anonymizer stores to create new identifiers or by other processes to achieve the same result. Hashing may be effectuated by systematically converting one value to another in a manner that allows the first value to be retrieved through an additional hashing step. There may be both internal and external identifiers which allow for 3rd parties to use an external identifier for their source. For example, and without limitation, there may be a unique ID for the data source and another for a data destination. Each record containing PII may also include a unique identifier created by hashing both the data source identifier and an identifier for the PII.

In operation the PII and the data source ID may be fed to an anonymizer to create a unique "external" ID that is used only by that data source or the data recipient. While internally the anonymizer keeps its own unique "internal" which may be formed by standard techniques of generating GUIDs or other processes. The IDs or GUIDs may be created dynamically for additional security. For example, and without limitation, a requester for anonymized data may receive a dataset with an external ID, wherein a second requester for the same dataset may receive it with a different external ID. Moreover, a single requester may receive identical datasets with different external IDs depending on the conditions of the request. This may further obfuscate PII from being compromised.

Scoring Algorithms

Scoring algorithms may compare PII among different data sources. For example, and without limitation, each data source may have PII that includes a birthdate, gender and name. If data from two sources contains this exact same PII, a score will be relatively higher. If information is missing, but partially similar, then the score would be relatively lower. If the PII includes different information, then the score will be even lower, indicating a high probability they are not the same person or entity.

The more PII, the better the scoring may be. For example, and without limitation, besides the PII information listed above, other information such as high school attended, branch of the military, social security number, and the like may be included to calculate a score. Conventional weighting methods may be used to guide the calculation to a more accurate scoring process. For example, birthdays may be more significant than birthplace.

Scoring algorithms are not restricted to matching data between two different data sources. For example, Source #1 may provide only name and drivers license number. Source #2 may have name, gender, birth date and social security number. Based on this information alone, these two records could not be positively linked. However, if Source #3 were able to provide both social security number and drivers license number then all three records could be matched with a very high score.

Searching the Data Store

One of the key benefits of the techniques disclosed herein is the ability to search the data which is something that encrypting data fields in a database does not easily allow. When data is 'sundered' as disclosed herein, each pertinent value from a data record (i.e. any field which is sundered) may be placed in a column-oriented table. That table typically holds just two fields, a numeric ID and the value being sundered. For example, and without limitation, a sunder-table that holds first names as shown:

| First Name ID | First Name |
|---|---|
| 1 | Matt |
| 2 | Brenna |
| 3 | Brianne |
| 4 | Jennifer |
| 5 | Rachel |
| 6 | Garrett |
| 7 | Mark |
| 8 | Jenny |
| 9 | Lisa |
| 10 | Eric |

When there is a data record in for first name Jenny, the First Name ID value for that record is 8. However, if the sunder value for first name is −2 the value stored in the record for Jenny, as her first name, is 6. (8+(−2)=6). Therefore, to de-sunder the record the process is reversed by taking the value of First Name ID on her record and multiply the sunder key by −1 resulting in 6+(−2*−1)=8. This would point to the correct value.

To query, find the record id (i.e. select first_name_id where first_name='Jenny') which would equal 8 and then apply the sunder key (−2) to find any record with that value. A direct query may look like this:

```
Select *
    From person
    Where first_name_id =
        ( (select first_name_id
            From first_name_table
            Where first_name = 'Jenny'
        ) * @sunder_value )
```

While the query shown operates on a known sunder key, it may be expanded to include both internal and external sunder keys by adding the external sunder key to create a combine value useful for searching.

In yet another embodiment the sunder keys may be hidden. For example, and without limitation, a customer may be given an account key which provides access to the system. That key could be in the form of a globally unique identifier (GUID) such as CA2071FD-288D-4771-BDBD-9FC6FC77C0F2. The external customer sunder key for first name could be the decimal value of characters 2 and 5 multiplied by each other. In this example the second character in the sequence "2" is the letter "A" in hexadecimal notation. An 'A' in hexadecimal equates to 10. When the 10 is multiplied by character 7 (the 5th character in the GUID) the external sunder key would be 70. Each field being sundered could be a different combination of characters from the account key and various other, similar, methods could be used to determine the sign (positive or negative) of each value. In this embodiment a GUID will include one or more sunder keys.

Matching Request

Figure 6:
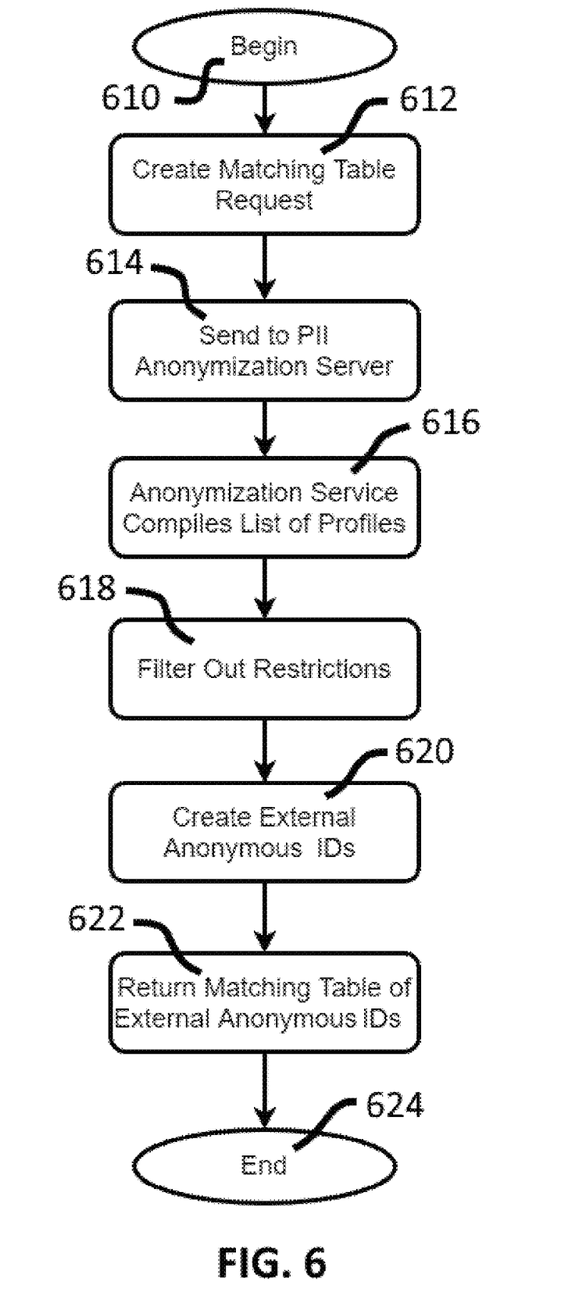
FIG. 6 shows a method which may be employed to retrieve matched data form a variety of sources.

FIG. 6 shows a method which may be employed to retrieve matched (or potentially matched) data from a variety of sources. The method begins at a flow label 610.

At a step 612 an aggregator creates a matching table request. This request may include a scope and a minimum matching score information.

At a step 614 the request is sent to the anonymization server.

At a step 616 the anonymization server compiles a list of profiles that meet the criteria. This list includes internal anonymous IDs.

At a step 618 restrictions are filtered out. These restrictions may include, but our not limited to, restrictions on access which may be placed by the person of entity whose private information is contained in the database. For example, and without limitation a user may restrict who has access to their PII. That restriction may be imposed on the data requestor by the anonymizer.

At a step 620 external IDs are created using an algorithm tailored to the requestor. For example, and without limitation that algorithm may hash the internal ID with the data requester's unique ID.

At a step 622 the matching table, anonymized with external IDs is returned to the requester.

At a flow label 624 the method ends.

DBMS Implementation

One embodiment of the disclosures presented herein may entail delivering the functionality in a database management system (DBMS). This may be effectuated by extending the Structured Query Language (SQL) used by a DBMS beyond the American National Standards Institute's (ANSI) Standard. The DBMS SQL extensions would enable a user of this improved DBMS to benefit from all the capabilities disclosed herein without having to implement the process on an ad hoc basis. In these embodiments, the SQL extensions may be added to core SQL commands including, but not limited to, CREATE, ALTER, SELECT, UPDATE and DELETE.

SQL Extensions

CREATE SUNDER KEY—The sunder keys may be defined as illustrated in these examples or, in certain embodiments, they could be defined at a higher level to prevent a user from knowing how the data is sundered. For example, a command such as this may be added as a SQL extension in the DBMS:

CREATE SUNDER KEY FirstName Value=XXXX

Or

ALTER SUNDER KEY FirstName Value=XXXX

These commands could be used to define and change the sunder key values so that each instance of a database has different sunder values such that knowing how data is sundered in one database would not provide information about de-sundering data in a different instance of the same database.

A CREATE SUNDER command may be added to define to the DBMS a type of value to be sundered. For example, CREATE SUNDER TABLE First_Name may create a new sundered table which would store the values of people's first names. By executing this command, a table would be created that would hold the sunder values. It would also enable this 'type' of sunder value to be referred to by name in other commands.

The CREATE TABLE SQL command includes parameters to define each column in the table. As part of the data sundering SQL Extension a column-level command such as SUNDERED could be added. This would tell the DBMS that this column is not to be stored natively but instead to use a Sundered table to store its values. For example,

```
CREATE TABLE Person
    (Person_First_Name SUNDERED (First_Name) SunderKey =
FirstName,
...)
```

Would create a table called Person and add a column to the table called Person_First_Name. Rather than storing the actual value of the person's first name in that column the DBMS would use the First_Name sundered table which was created using the CREATE SUNDER command.

Once the type of functionality, defined as above, is a command such as:

SELECT Person First Name SunderKey=FirstName
FROM Person

Would automatically use the parameter SunderKey to return the actual value from the sunder table for first names without the user having to specify how that is done.

As shown herein, data sundering provides distinct advantages over traditional encryption because it may be easier to search, and even if nefarious people gain access to the data source, there are multiple keys required to make any sense of the data. These keys may include the name table, the sunder Key, and any external key. Moreover, incorporating sundering into a DBMS provides a significant performance improvement over column-level encryption because it returns results with the same response time as unencrypted data. When compared to having to decrypt conventional encrypted columns which require significantly more time owing to the additional decryption step.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

I claim:

1. An improvement to a database management system including:
   creating a first table, said table including a first record key field and a first data field;
   creating a second table, said table including a second record key field and a second data field;
   receiving a data and creating a record key for the data in the first table and the second table wherein the record key is created by combining a user key and a private key;
   modifying the record key by hashing it with a predefined modifier;
   storing a reference to the data with the modified record key wherein the predefined modifier for the first table is different from the predefined modifier for second table;
   receiving a record request said record request including the public key;

hashing the public key with the private key to determine a record identifier, and querying the database in response to said hashing.

2. The improvement of claim 1 wherein the hashing includes adding or subtracting a predetermined number from the record key.

\* \* \* \* \*